United States Patent Office 3,088,867
Patented May 7, 1963

3,088,867
COMPOSITIONS FOR THE CONTROL OF COCCIDIOSIS
Edward F. Rogers, Middletown, and Robert L. Clark, Woodbridge, N.J., assignors to Merck & Co., Inc., Rahway, N.J., a corporation of New Jersey
No Drawing. Filed Mar. 8, 1960, Ser. No. 13,452
5 Claims. (Cl. 167—53.1)

This invention relates to animal husbandry. More particularly, it is concerned with novel compositions and methods for the control and prevention of coccidiosis. Still more particularly, it is concerned with certain thiazolium quaternary salts which are effective in controlling coccidiosis when fed in small amounts to poultry.

Coccidiosis is a common and widespread poultry disease caused by several species of protozoan parasites of the genus Eimeria, such as *E. tenella*, *E. necatrix*, *E. acervulina*, *E. maxima*, *E. hagani* and *E. brunetti*. *E. tanella* is the causative agent of a severe and often fatal infection of the ceca of chickens which is manifested by extensive hemorrhage, accumulation of blood in the ceca, and the passage of blood in the droppings. *E. necatrix* as well as certain other species attack the small intestine of the chick causing what is known as intestinal coccidiosis. Related species of coccidia such as *E. melagridis* and *E. adenoides* are causative organisms of coccidiosis in turkeys. When left untreated, the severe forms of coccidiosis lead to poor weight gain, reduced feed efficiency and high mortality in fowl. The elimination or control of coccidiosis is, therefore, of paramount importance in the poultry raising industry.

One object of this invention is to provide novel compositions which may be orally administered to poultry and are effective in treating and preventing coccidiosis. A further object is to provide a new method for preventing and controlling coccidiosis. Other objects will become apparent from the following description of the invention.

According to the present invention it has been found that the 3-(2-lower alkyl-4-amino-5-pyrimidylmethyl) thiazolium quaternary salts, and particularly those compounds wherein the thiazole ring is substituted in the 2 and/or 4-positions with a lower alkyl group when administered orally dispersed in or admixed with a suitable carrier are highly effective in preventing and treating coccidiosis in poultry.

The anticoccidial compounds within the purview of this invention may be represented by the general formula:

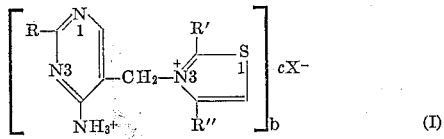

(I)

wherein R is a lower alkyl radical, R and R'' are hydrogen or lower alkyl, X is an anion, and b and c are positive numbers having values such that the positive charge of b moles of cation is neutralized by c moles of anion X. Thus, for example, when X is a monovalent such as a halide, b is 1 and c is 2.

As will be apparent from the above structural formula, the anticoccidial compounds described herein may be considered as substituted thiazoles. The thiazole ring is substituted at the 3-position by a 2-lower alkyl-4-amino-5-pyrimidylmethyl radical. It may be further substituted at the 2- and/or 4-positions by a lower alkyl radical. The pyrimidine moiety contains at the 2-position of the pyrimidine ring a lower alkyl radical. When more than one lower alkyl group is present in the quaternary salt such lower alkyl groups need not, of course, be the same in any particular compound.

With further regard to Formula I, the anion (designated as X) may be an inorganic anion such as chloride, bromide, iodide, nitrate, sulfate, phosphate and the like, or the anion of an organic acid such as citric, tartaric, acetic, picric, stearic, succinic, benzoic, phthalic, phenoxyacetic, embonic, abietic, 2-naphthalenesulfonic or ethylenediamine tetraacetic acids. It may also be the anion of a polymer such as polyphosphate or polystyrenesulfonate ion. However, the nature of the anion is not critical since the activity of these quaternary salts is centered in the cationic portions of these compounds. Accordingly, any anion may be employed as long as it is not unduly toxic for the poultry. For practical reasons the anions of the mineral acids and strong organic acids are preferred. It will be readily realized by those skilled in this art that an acid addition salt of the primary amino group present in these compounds will also be formed concurrently with the quaternary salt. Accordingly, it is to be understood that the expression "quaternary salt" is being used in this specification and appended claims to mean the acid addition salt of such quaternary salt.

The preferred compounds of the invention are the 3-(2-lower alkyl-4-amino-5-pyrimidylmethyl)-lower alkylated thiazolium quaternary salts having a lower alkyl radical in the 2- and/or 4-position of the thiazole ring. Included among these are the 3-(2-ethyl-4-amino-5-pyrimidylmethyl)-2-methyl thiazolium salts, 3-(2-ethyl-4-amino-5-pyrimidylmethyl)-4-methyl thiazolium salts, 3-(2-ethyl-4-amino-5-pyrimidylmethyl)-2,4-dimethyl thiazolium salts, 3-(2-n-propyl-4-amino-5-pyrimidylmethyl)-2-methyl thiazolium salts, 3-(2-n-propyl-4-amino-5-pyrimidylmethyl)-4-methyl thiazolium salts and 3-(2-n-propyl-4-amino-5-pyrimidylmethyl)-2,4-dimethyl thiazolium salts.

As previously indicated the compounds described herein when administered orally are effective in the treatment and prevention of coccidiosis in poultry. These compounds are conveniently fed to poultry as a component of the feed or drinking water of the animals although they may also be administered orally dispersed or admixed with other carriers or diluents. According to one aspect of the invention, novel compositions are provided in which a thiazolium quaternary salt is present as an anticoccidial ingredient. Such compositions comprise the quaternary salt intimately dispersed in or admixed with an inert carrier or diluent. By inert carrier is meant one that is substantially non-reactive with respect to the quaternary and that may be administered orally with safety to the animals. The preferred compositions of this type, that is, where the quaternary salt is present as an anticoccidial ingredient, are those in which the active ingredient is intimately dispersed or suspended in or admixed with the normal elements of poultry sustenance. By normal elements of poultry sustenance is meant the feed and drink normally partaken by the poultry such as grain, water and/or other liquids. However, as indicated above, compositions comprising a quaternary salt intimately dispersed in or admixed with any carrier or diluent which is substantially inert with respect to the quaternary, orally ingestable and tolerated by the animals, may be satisfactorily employed.

The amount of thiazolium quaternary salt required for control of coccidiosis in poultry will, of course, vary somewhat with the specific compound or compounds employed. In general, the compounds of this invention are effective in preventing the disease without intolerable toxic effect when administered at levels of less than about 0.05% by weight of the feed. With the preferred compounds of the invention, i.e., the 3-(2-lower alkyl-4-amino-5-pyrimidylmethyl)-2 and/or 4-lower alkylated thiazolium salts, good prophylactic results are obtained when from about 0.0005% to about 0.05% by weight of the total feed consumed is administered; for most satisfactory results it is preferred that the poultry feed contain between about 0.0025% and 0.025% by weight of thiazolium salt. When the thiazolium salts are to be employed as therapeutic agents, the higher levels are used for relatively short periods of time. Thus, concentrations of about 0.02% to 0.05% by weight of the feed may be advantageously administered in treating an established outbreak of coccidiosis. When these compounds are employed as therapeutic agents it is desirable to employ the lowest levels that afford fully adequate control of coccidiosis in order to eliminate as far as possible any risk of side effects that might appear on prolonged feeding of the compound.

In the preparation of solid compositions a uniform dispersion of admixture of the quaternary salt throughout the carrier can be readily effected by the usual methods of grinding, stirring, milling or tumbling. By altering the amount of drug added, and the carrier used, compositions of varying concentrations may be made to suit any purpose.

Many of these thiazolium quaternary salts are desirably or advantageously administered to poultry by way of the drinking water of the birds. This method of treatment is often employed in the therapeutic use of our compounds since poultry with coccidiosis are apt to consume less solid feed than normal birds. The water-soluble quaternary salts may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from 1 to 25% by weight of the quaternary compound are suitable in practicing our invention.

According to another aspect of the invention, novel compositions are provided in which the active ingredient is present in relatively large amounts and which are suitable for addition to the poultry feed either directly or after an intermediate dilution or blending step. These compositions which are commonly referred to in the art as feed supplements and are a preferred feature of this invention provide a more convenient way of obtaining a uniform distribution in the feed of relatively small amounts of the active ingredient required for an effective dosage. Any orally ingestable solid carrier which is substantially inert with respect to the quaternary salt and tolerated by the animals may be satisfactorily employed. Examples of carriers or diluents suitable for such compositions are solid orally ingestable carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The quaternary salts are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight, of active ingredient are particularly suitable for addition to poultry feed, and compositions containing from about 5–15% by weight of coccidostat are very satisfactory. The active compound is normally dispersed or mixed uniformly in the diluent but in some instances may be sorbed on the carrier. The optimal concentration of coccidostat in these feed supplements will depend to some extent on the particular compound employed. Since it is convenient for the feed manufacturer to use about one pound of feed supplement for each ton of finished feed, the preferred concentration of any one of our coccidostats in a feed supplement is partly a function of the level of active ingredient desired in the finished feed.

The compounds described herein are synthesized by reacting together an appropriately substituted pyrimidine and thiazole or an alkylated thiazole. According to one process, a 2-lower alkyl-4-amino-5-halomethyl pyrimidine dihydrohalide in which the halogen is bromine or chlorine, is reacted directly with the thiazole or alkylated thiazole. An excess of the liquid thiazole or alkylated thiazole or alternatively organic solvents inert under the reaction conditions such as the lower alkanols, acetonitrile or an N,N-dilower alkyl alkanoamide may be employed as the reaction medium. The temperature is not critical and it is preferred to carry out the process at about room temperature. The products precipitate out from the reaction mixture on standing at room temperature or on the addition of a suitable precipitant such as ether, ethyl acetate and the like and can be recovered by filtration or other conventional techniques. This process may be represented as follows:

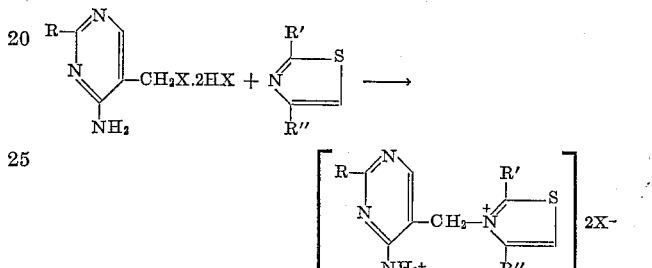

where R is a lower alkyl radical, R' and R" are hydrogen or lower alkyl and X is chlorine or bromine.

Although the 5-halomethyl pyrimidine dihydrohalides are generally most conveniently employed for reaction with the thiazole or alkylated thiazole, the quaternization may also be brought about with an ester of a 2-lower alkyl - 4 - amino - 5 -hydroxymethyl pyrimidine. Suitable esters are the methylsulfinate, p-toluenesulfonate, benzenesulfonate, naphthalenesulfonate, nitrate, phosphate and sulfate esters. Such esters are normally employed in the form of their acid addition salt.

The quaternization may be conducted so that the particular salt desired is obtained directly or the quaternary salt recovered from the reaction medium may be conveniently metathesized to the desired salt by techniques known in the art.

The preparation of representative compounds and compositions containing such compounds is more fully described in the following examples. However, these examples are illustrative and are not to be considered as limiting the invention.

EXAMPLE 1

*3-(2-Ethyl-4-Amino-5-Pyrimidylmethyl)-2-Methyl Thiazolium Bromide Hydrobromide*

To a stirred suspension of 5 g. of 2-ethyl-4-amino-5-pyrimidylmethyl bromide dihydrobromide in 50 ml. of acetonitrile is added 10 ml. of 2-methyl thiazole. After allowing the mixture to stand overnight at room temperature the precipitate which forms is recovered by filtration and recrystallized from 30 ml. of boiling methanol by the addition of 15 ml. of ethyl acetate. The crystalline 3-(2-ethyl - 4 - amino - 5 - pyrimidylmethyl) - 2 - methyl thiazolium bromide hydrobromide thus obtained has a melting point of 255–257° C.

When the above process is carried out employing thiazole, 2-ethyl thiazole and 2-n-propyl thiazole in place of 2-methyl thiazole there is obtained respectively 3-(2-ethyl-4-amino-5-pyrimidylmethyl) thiazolium bromide hydrobromide, 3-(2-ethyl-4-amino-5-pyrimidylmethyl)-2-ethyl thiazolium bromide hydrobromide and 3-(2-ethyl-4-amino-5-pyrimidylmethyl)-2-n-propyl thiazolium bromide hydrobromide.

Six pounds of 3-(2-ethyl-4-amino-5-pyrimidylmethyl)-2-methyl thiazolium bromide hydrobromide is uniformly mixed with 94 pounds of wheat standard middlings. The resulting feed supplement contains 6% active ingredient. One pound of this supplement uniformly mixed with 3,000 pounds of a poultry feed produces a feed composition containing 0.002% active ingredient.

EXAMPLE 2

*3-(2-Ethyl-4-Amino-5-Pyrimidylmethyl)-4-Methyl Thiazolium Bromide Hydrobromide*

To a stirred suspension of 10 g. of 2-ethyl-4-amino-5-pyrimidylmethyl bromide dihydrobromide in 50 ml. of acetonitrile is added 10 ml. of 4-methyl thiazole. After allowing the the reaction to stand at room temperature for 18 hours the precipitate which forms is recovered by filtration and recrystallized from 30 ml. of warm 40% hydrobromic acid by the addition of 30 ml. of ethyl acetate. The 3-(2-ethyl-4-amino-5-pyrimidylmethyl)-4-methyl thiazolium bromide hydrobromide thus obtained has a melting point of 276–277° C.

Ten pounds of 3-(2-ethyl-4-amino-5-pyrimidylmethyl)-4-methyl thiazolium bromide hydrobromide is uniformly mixed with 90 pounds of corn distillers' grains. The resulting feed supplement contains 10% active ingredient. One pound of this supplement uniformly mixed with one ton of poultry feed produces a feed composition containing 0.05% active ingredient.

EXAMPLE 3

*3-(2-n-Propyl-4-Amino-5-Pyrimidylmethyl)-4-Methyl Thiazolium Bromide Hydrobromide*

To a slurry of 15 g. of 2-n-propyl-4-amino-5-pyrimidylmethyl bromide dihydrobromide in 75 ml. of acetonitrile is added 15 ml. of 4-methyl thiazole. After allowing the mixture to stand for 24 hours at room temperature the crystalline material which forms is collected by filtration. The 3-(2-n-propyl-4-amino-5-pyrimidylmethyl)-4-methyl thiazolium bromide hydrobromide thus obtained has a melting point of 241–243° C.

When the above process is carried out employing 2-ethyl thiazole and 2-n-propyl thiazole in place of 4-methyl thiazole there is obtained 3-(2-n-propyl-4-amino-5-pyrimidylmethyl)-2-ethyl thiazolium bromide hydrobromide and 3 - (2 - n- propyl - 4 - amino - 5 -pyrimidylmethyl)-2-n-propyl thiazolium bromide hydrobromide.

Twenty pounds of 3-(2-n-propyl-4-amino-5-pyrimidylmethyl)-4-methyl thiazolium bromide hydrobromide is uniformly mixed with 30 pounds of corn germ meal and 50 pounds of corn distillers' grains. The resulting feed supplement contains 20% active ingredient.

EXAMPLE 4

*3-(2-n-Propyl-4-Amino-5-Pyrimidylmethyl)-2,4-Dimethyl Thiazolium Bromide Hydrobromide*

To a slurry of 15 g. of 2-n-propyl-4-amino-5-pyrimidylmethyl bromide dihydrobromide in 75 ml. of acetonitrile is added 15 ml. of 2,4-dimethyl thiazole. The mixture is heated under reflux on a steam bath for 20 hours. The precipitate which forms is recovered by filtration and recrystallized from 6 ml. of 40% hydrobromic acid by the addition of ethyl acetate. The 3-(2-n-propyl-4-amino-5-pyrimidylmethyl)-2,4-dimethyl thiazolium bromide hydrobromide thus obtained has a melting point of 241–243° C.

When the above process is carried out employing 2-ethyl-4-methyl thiazole and 2,4-diethyl thiazole in place of 2,4-dimethyl thiazole there is obtained respectively 3 - (2 - n - propyl - 4 - amino - 5 - pyrimidylmethyl) - 2-ethyl-4-methyl thiazolium bromide hydrobromide and 3-(2 - n - pyropyl - 4 - amino - 5 - pyrimidylmethyl) - 2,4-diethyl thiazolium bromide hydrobromide.

Forty pounds of 3-(2-n-propyl-4-amino-5-pyrimidylmethyl)-2,4-dimethyl thiazolium bromide hydrobromide is uniformly mixed with sixty pounds of ground oyster shells. The resulting feed supplement contains 40% active ingredient.

EXAMPLE 5

*3-(2-Ethyl-4-Amino-5-Pyrimidylmethyl)-2-Methyl Thiazolium Chloride Hydrochloride*

200 mg. of 3-(2-ethyl-4-amino-5-pyrimidylmethyl)-2-methyl thiazolium chloride hydrochloride is dissolved in 0.8 ml. of concentrated hydrochloric acid. This solution is then carefully diluted with acetone to precipitate the chloride hydrochloride. This salt is then dissolved in 0.5 ml. of concentrated hydrochloric acid and the solution slowly diluted with about 8 ml. of acetone. The 3-(2-ethyl-4-amino-5-pyrimidylmethyl)-2 - methyl thiazolium chloride hydrochloride is then recovered by filtration and dried to constant weight.

When the quaternary salts of Examples 1 through 4 are treated with hydrochloric acid by the method described above, the corresponding chloride hydrochloride quaternary salts are obtained.

Fifteen pounds of 3-(2-ethyl-4-amino-5-pyrimidylmethyl)-2-methyl thiazolium chloride hydrochloride is uniformly mixed with eighty-five pounds of powdered sucrose. The resulting water-soluble powder composition contains 15% active ingredient.

EXAMPLE 6

*3-(2-Ethyl-4-Amino-5-Pyrimidylmethyl)-2-Methyl Thiazolium-1,5-Naphthalene Disulfonate*

3.7 g. of 3-(2-ethyl-4-amino-5-pyrimidylmethyl)-2-methyl thiazolium bromide hydrobromide is dissolved in 10 ml. of water. To this solution is added 2.9 g. of 1,5-naphthalenesulfonic acid. After allowing the reaction mixture to stand in ice water for 2 hours, the solid 3-(2-ethyl-4-amino-5-pyrimidylmethyl)-2-methyl thiazolium-1,5 naphthalene disulfonate which forms is removed by filtration, washed with water and dried to constant weight.

EXAMPLE 7

The 2-lower alkyl-4-amino-5-halomethyl pyrimidines employed in making the quaternary compounds of this invention are prepared by methods described in the literature or in the following manner:

A. *2-lower alkyl-4 - amino - 5 - cyanopyrimidine.*—A slurry of 54.7 grams of butyramidine hydrochloride and 55 ml. of absolute ethanol is treated at about 5° C. with a solution of 11 grams of sodium in 220 ml. of absolute ethanol. The resulting solution is added with stirring at 10–12° C. over a thirty minute period to 53.7 grams of ethoxymethylenemalononitrile in 54 ml. of absolute ethanol. The resulting mixture is stirred at 0° C. for six hours and then at room temperature for about 12 hours. The mixture is then filtered, evaporated to dryness in vacuo and the residue treated with water. The alcoholic and aqueous solution precipitates are combined, washed with water and dried in air. The product is recrystallized from alcohol to give 2-n-propyl-4-amino-5-cyanopyrimidine.

When the above reaction is carried out with acetamidine there is obtained 2-methyl-4-amino-5-cyanopyrimidine. When propionamidine is employed as starting material the end product is 2-ethyl-4-amino-5-cyanopyrimidine.

B. *2 - lower alkyl - 4 - amino - 5 - aminomethyl pyrimidine dihydrochloride.*—16.2 grams of 2-n-propyl-4-amino-5-cyanopyrimidine is reduced at about 40 lbs. pressure in 200 ml. of methanol in the presence of 26 grams of ammonia and one tablespoon of Raney nickel. The drop in pressure is about 36.5 lbs. The reaction mixture on completion of the reduction is concentrated to a syrup after filtering off the catalyst. The residue thus obtained is acidified with dilute hydrochloric acid and concentrated to a crystalline mass. On recrystallization from methanol-acetone there is obtained 2-n-propyl-4-amino-5-aminomethyl pyrimidine dihydrochloride.

When the 2-methyl and 2-ethyl-4-amino-5-cyanopyrimidines obtained as described above are used as starting materials in this reduction, there are obtained respectively 2-methyl-4-amino-5-aminomethyl pyrimidine dihydrochloride and 2-ethyl-4-amino-5-aminomethyl pyrimidine dihydrochloride.

C. *2-lower alkyl-4-amino-5-hydroxymethyl pyrimidine.*—Twelve grams of 2-n-propyl-4-amino-5-aminomethyl pyrimidine dihydrochloride in 50 ml. of water is treated at 50–60° C. with a solution of 3.5 grams of sodium nitrite in 30 ml. of water. The sodium nitrite is added dropwise over a 45-minute period. The heating is continued for an additional two hours, and the reaction mixture then made alkaline with sodium carbonate and extracted with butanol. The butanol extract is evaporated to dryness and the residue crystallized from acetone to give 2-n-propyl-4-amino-5-hydroxymethyl pyrimidine.

When the 2-methyl and 2-ethyl-4-amino-5-aminomethyl pyrimidine dihydrochlorides obtained as in part B above are utilized in this reaction in place of the 2-n-propyl compound, there are obtained 2-methyl-4-amino-5-hydroxymethyl pyrimidine and 2-ethyl-4-amino-5-hydroxymethyl pyrimidine.

D. *2-lower alkyl-4-amino - 5 - bromomethyl pyrimidine.*—The 2--n-propyl-4-amino - 5 - hydroxymethyl pyrimidine obtained in part C above is dissolved in 15 ml. of acetic acid with hydrogen bromide, and the mixture allowed to stand at room temperature for about 15 hours. 2-n-propyl-4-amino-5-bromomethyl pyrimidine dihydrobromide crystallizes and is recovered by filtration and washed with ether. The material is substantially pure and may be used directly in preparing the quaternary salts of this invention.

The other 2-lower alkyl-4-amino-5-hydroxymethyl pyrimidines described above are treated in like manner with hydrogen bromide to give 2-methyl-4-amino-5-bromomethyl pyrimidine dihydrobromide and 2-ethyl-4-amino-5-bromomethyl pyrimidine dihydrobromide.

Any departure from the above description which conforms to the present invention is intended to be included within the scope of the claims.

What is claimed is:

1. A composition useful in the control of coccidiosis which comprises a poultry feed having dispersed therein from about 0.0005% to about 0.05% by weight of a compound of the formula

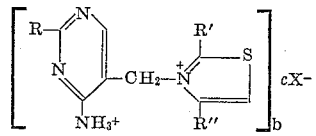

wherein R is a lower alkyl radical, R' and R" are selected from the group consisting of hydrogen and lower alkyl, X is an anion and $b$ and $c$ are positive numbers having values such that the positive charge of $b$ moles of cation is neutralized by $c$ moles of anion X.

2. A poultry feed having dispersed therein from about 0.0005% to about 0.05% by weight of a 3-(2-lower alkyl-4-amino-5-pyrimidylmethyl)-2-lower alkyl thiazolium quaternary salt.

3. A poultry feed having dispersed therein from about .0025% to about .025% by weight of a 3-(2-ethyl-4-amino-5-pyrimidylmethyl)-2-methyl thiazolium quaternary salt.

4. A poultry feed having dispersed therein from about 0.0005% to about 0.05% by weight of a 3-(2-lower alkyl-4-amino-5-pyrimidylmethyl)-4-lower alkyl thiazolium quaternary salt.

5. A poultry feed having dispersed therein from about 0.0005% to about 0.05% by weight of a 3-(2-lower alkyl-4-amino-5-pyrimidylmethyl)-2,4-dilower alkyl thiazolium quaternary salt.

References Cited in the file of this patent

Chem. Abst. (Subject Index), vol. 51, page 2392S (under Thiazolium compounds), 1957.

Hajime: Chem. Abst., vol. 51, pages 429 and 430 (1957).